United States Patent
Okuda et al.

(10) Patent No.: US 7,229,117 B2
(45) Date of Patent: Jun. 12, 2007

(54) VEHICLE SEAT MOVING DEVICES

(75) Inventors: Shinji Okuda, Toyota (JP); Hideki Akiya, Toyota (JP); Tadashi Nie, Nagoya (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/396,351

(22) Filed: Mar. 30, 2006

(65) Prior Publication Data
US 2006/0261624 A1 Nov. 23, 2006

(30) Foreign Application Priority Data
May 20, 2005 (JP) ............................. 2005-147909

(51) Int. Cl.
*B60N 2/12* (2006.01)
(52) U.S. Cl. .................... 296/64; 296/65.09; 296/65.11
(58) Field of Classification Search ................. 296/64, 296/65.09, 65.11; 244/118.6, 122 R; 297/257
See application file for complete search history.

(56) References Cited
U.S. PATENT DOCUMENTS
4,184,656 A * 1/1980 Wakeley ................... 244/118.6

6,457,765 B1 * 10/2002 Bergquist et al. ............. 296/64

FOREIGN PATENT DOCUMENTS
JP 2002-120604 4/2002

* cited by examiner

Primary Examiner—Joseph D. Pape
(74) Attorney, Agent, or Firm—Patterson, Thuente, Skaar & Christensen, P.A.

(57) ABSTRACT

A vehicle seat moving device may include first and second longitudinal moving mechanisms and a lateral moving mechanism. Each of the longitudinal moving mechanisms has a longitudinal slide rail that is attached to a vehicle floor and a longitudinal slider that is associated with a vehicle seat. The lateral moving mechanism has a lateral moving path that is attached to a vehicle floor and a lateral moving element that is movably attached to the lateral moving path. The lateral moving path is disposed between the first and second longitudinal moving mechanisms so that the lateral moving element can move between the first and second longitudinal moving mechanisms. The longitudinal slider is arranged and constructed to slidably engage to the longitudinal slide rail. Also, the longitudinal slider is arranged and constructed to be engaged with and disengaged from the longitudinal slide rail or the vehicle seat. Further, the lateral moving element can support the vehicle seat thereon when the longitudinal slider is removed from the longitudinal slide rail, thereby permitting lateral movement of the vehicle seat.

15 Claims, 7 Drawing Sheets

VEHICLE SEAT MOVING DEVICES

BACKGROUND OF THE INVENTION

The present invention relates to vehicle seat moving devices. More particularly, the present invention relates to vehicle seat moving devices that can move a vehicle seat in the longitudinal direction (i.e., the forward and rearward direction) and the lateral direction (i.e., the widthwise direction) of a vehicle in order to rearrange or reposition the vehicle seat.

Various types of vehicle seat moving devices are already known. Such vehicle seat moving devices are taught, for example, by Japanese Laid-Open Patent Publication No. 2002-120604.

In the known vehicle seat moving devices, a vehicle floor is provided with a slide groove that is formed therein in a continuous grid-like pattern. The grid-like slide groove is arranged so as to extend in the longitudinal and lateral directions of a vehicle. Conversely, vehicle seats are respectively provided with engagement legs. The engagement legs of the vehicle seats slidably engage the slide groove so that the vehicle seats can move along the slide groove. As a result, the vehicle seats can freely move on the vehicle floor in the longitudinal and lateral directions of the vehicle. Thus, the vehicle seats can be positioned or arranged on the vehicle floor in a wide variety of patterns.

However, in the vehicle seat moving devices thus constructed, the vehicle seats are supported only by the engagement legs. Therefore, it is technically difficult to design the vehicle seats in a manner such that the vehicle seats can be reliably supported on the vehicle floor even if a large load is applied thereto due to a vehicle collision or other such accidents. Generally, in order to increase the support strength of the engagement legs, the engagement legs must be additionally provided with a high-performance locking mechanism or other such rigidifying mechanisms. As a result, the structure of the vehicle seats is complicated. This may lead to an increased manufacturing cost.

BRIEF SUMMARY OF THE INVENTION

It is, accordingly, one object of the present teachings to provide an improved vehicle seat moving device.

For example, in one aspect of the present teachings, a vehicle seat moving device may include first and second longitudinal moving mechanisms and a lateral moving mechanism. Each of the longitudinal moving mechanisms has a longitudinal slide rail that is attached to a vehicle floor and a longitudinal slider that is associated with a vehicle seat. The lateral moving mechanism has a lateral moving path that is attached to a vehicle floor and a lateral moving element that is movably attached to the lateral moving path. The lateral moving path is disposed between the first and second longitudinal moving mechanisms so that the lateral moving element can move between the first and second longitudinal moving mechanisms. The longitudinal slider is arranged and constructed to slidably engage to the longitudinal slide rail. Also, the longitudinal slider is arranged and constructed to be engaged with and disengaged from the longitudinal slide rail or the vehicle seat. Further, the lateral moving element can support the vehicle seat thereon when the longitudinal slider is removed from the longitudinal slide rail, thereby permitting lateral movement of the vehicle seat.

According to this vehicle seat moving device, the vehicle seat can be easily transferred between the first and second longitudinal moving mechanisms. Therefore, it is possible to easily change the seat arrangement, if necessary.

In addition, the vehicle seat is mounted on the vehicle floor by engaging the longitudinal slider attached to the vehicle seat with the longitudinal slide rail. Therefore, the vehicle seat can be reliably supported on the vehicle floor. As a result, the vehicle seat can sufficiently withstand a large load that can be applied thereto due to a vehicle collision or other such accidents.

In one embodiment, the lateral moving element can support the vehicle seat thereon in the folded and standing posture when the vehicle seat is moved laterally along the lateral moving path. Therefore, the back and forth bending load imposed on the lateral moving element is effectively reduced. As a result, it is not necessary to use the lateral moving element having higher strength.

In another embodiment, the lateral moving element comprises a lateral slider that is laterally slidably incorporated in the lateral moving path, According to this construction, the vehicle seat can smoothly move laterally along the lateral moving path.

Other objects, features, and advantages, of the present invention will be readily understood after reading the following detailed description together with the accompanying drawings and the claims.

BRIEF DESCRIPTION OF THE SEVERAL VIEWS OF THE DRAWINGS(S)

DETAILED DESCRIPTION OF THE INVENTION

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

Five detailed representative embodiments of the present teachings will now be described in further detail with reference to FIG. 1 to FIG. 13.

First Detailed Representative Embodiment

A first detailed representative embodiment of the present invention is shown in FIGS. 1 to 5.

Figure 1:
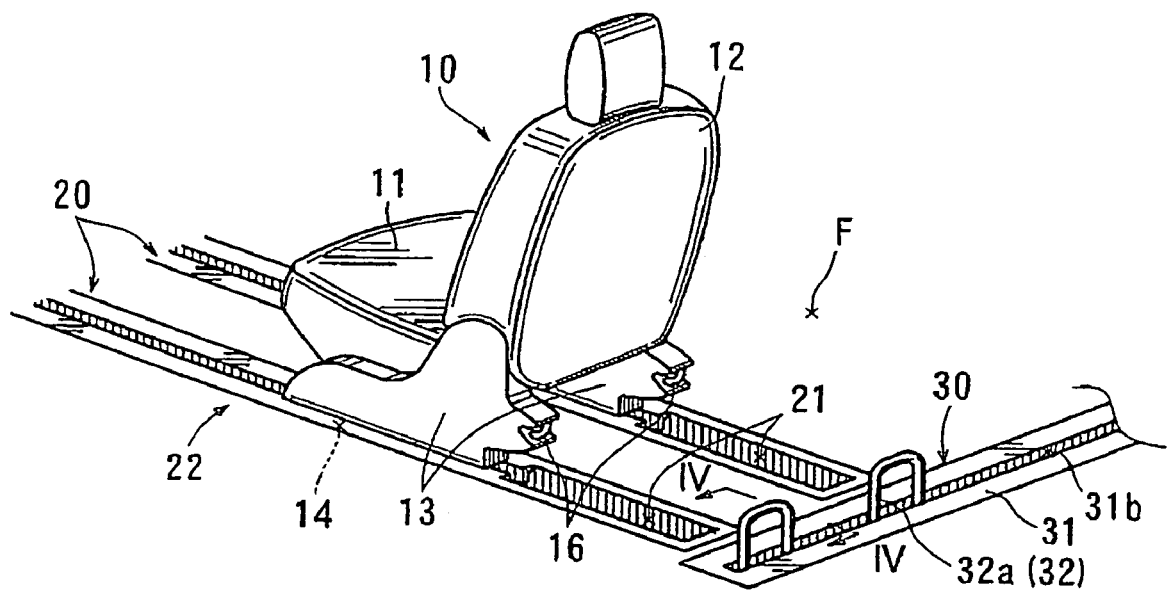
FIG. 1 is a perspective view of a vehicle seat moving device according to a first representative embodiment of the present invention that has a pair of longitudinal moving mechanisms (one of which is shown) and a lateral moving mechanism, in which a seat is positioned on one of the longitudinal moving mechanisms.
Figure 2:
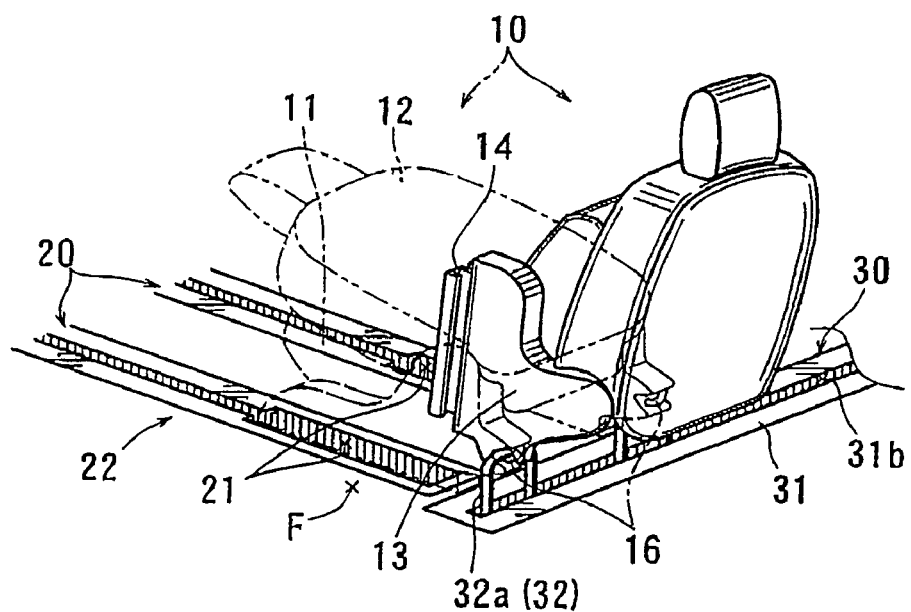
FIG. 2 is a perspective view of the vehicle seat moving device, in which the seat is transferred to the lateral moving mechanism.

As shown in FIGS. 1 and 2, this embodiment exemplifies a vehicle seat moving device that includes a first or left-side longitudinal moving mechanism 22 that generally corresponds to a left-side rear seat 10 (i.e., a rear seat that is arranged as a left-side row seat), a second or right-side longitudinal moving mechanism (not shown) that generally corresponds to a right-side rear seat (i.e., a rear seat that is arranged as a right-side row seat) (not shown), and a lateral moving mechanism 30 that can slide or move the left-side rear seat 10 (or the right-side rear seat) in a lateral or widthwise direction of a vehicle. However, the right-side longitudinal moving mechanism has the same structure as the left-side longitudinal moving mechanism 22 and is symmetrically positioned with respect to the left-side longitudinal moving mechanism 22. In addition, the right-side rear seat has the same structure as the left-side rear seat 10. Therefore, it is only necessary to describe the configurations of the left-side moving mechanism 22.

First, the seat 10 of this embodiment is generally composed of a seat back 12 and a seat cushion 11. The seat back 12 is rotatably connected to the seat cushion 11 via a seat reclining device (not shown). Therefore, the seat back 12 can be reclined back and forth relative to the seat cushion 11 by operating a operation lever (not shown). As will be appreciated, when a passenger (not shown) is sitting on the seat 10, the seat back 12 is generally positioned in a normal or vertical position (FIG. 1). Conversely, as shown by broken lines in FIG. 2, when a passenger is not sitting on the seat 10, the seat back 12 can be rotated to a folded or retracted position, if necessary. In addition, the seat 10 further includes a pair of seat support members 13 that are fixedly attached to the side portions of the seat cushion 11. As best shown in FIG. 1, the seat support members 13 of the seat 10 include a pair of engagement hooks 16. The engagement hooks 16 are attached to the rear ends of the seat support members 13 so as to project rearwardly therefrom. Further, the seat reclining mechanism used in this embodiment may preferably have the same structure as a known seat reclining mechanism. Therefore, a detailed description of the seat reclining mechanism will be omitted.

Figure 3:
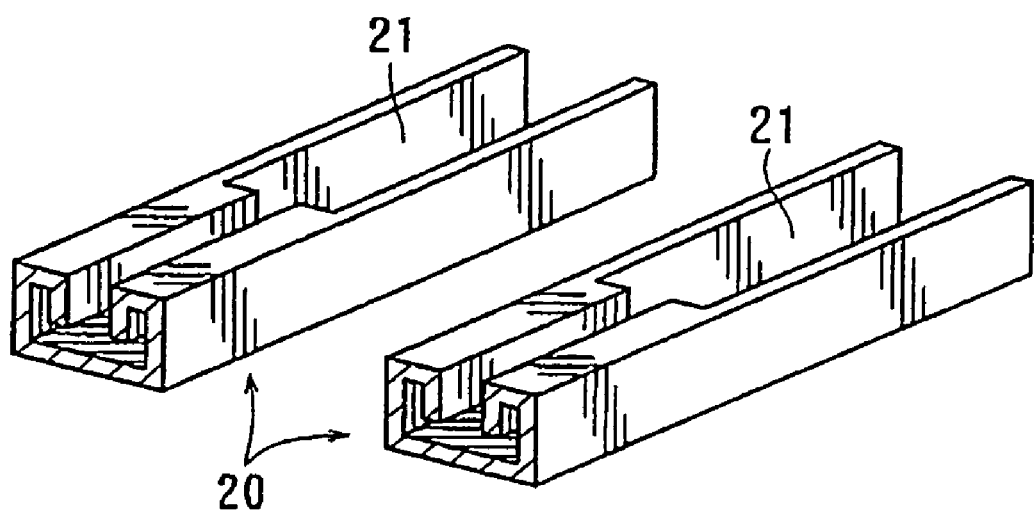
FIG. 3 is a perspective view of longitudinal slide rails of each of the longitudinal moving mechanisms.
Figure 5:
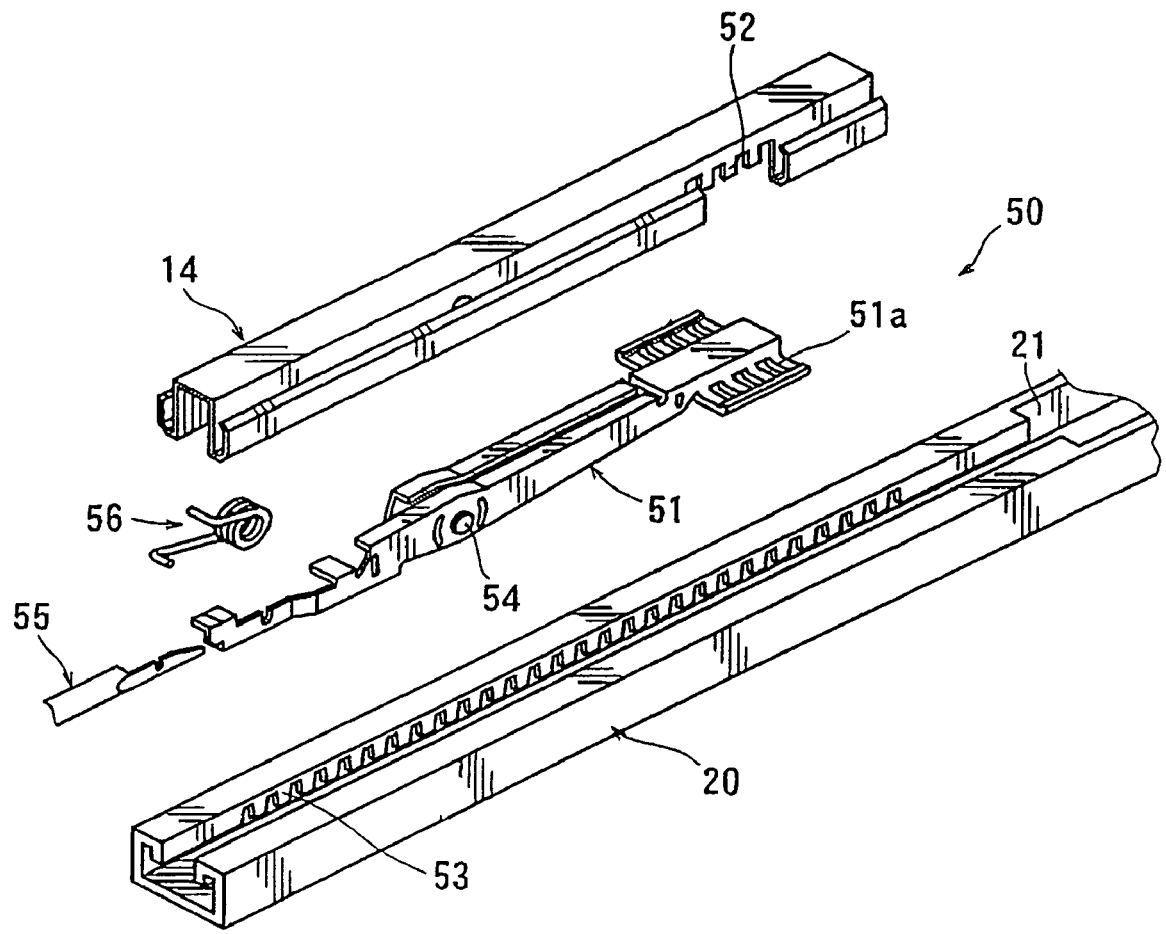
FIG. 5 is a perspective view of a slide locking mechanism of the longitudinal moving mechanisms.

As shown in FIGS. 1 and 2, the left-side longitudinal moving mechanism 22 includes a pair of linear longitudinal slide rails 20 that are attached to a vehicle floor F in parallel with each other, and a pair of elongated longitudinal sliders 14 that can respectively slidably engage the longitudinal slide rails 20. The slide rails 20 are embedded in the vehicle floor F so as to be coplanar with the surface of the vehicle floor F. As shown in FIGS. 1–3, the rear end portions of the slide rails 20 are respectively formed with enlarged openings 21 that are opened upwardly. The openings 21 respectively have a desired size and shape such that the sliders 14 can be engaged with and disengaged from the slide rails 20 via the openings 21 when the sliders 14 are shifted to rear ends of the slide rails 20. Conversely, the longitudinal sliders 14 are respectively integrally attached to the lower surfaces of the seat support members 13. The longitudinal moving mechanism 22 further includes a slide locking mechanism 50 so that the longitudinal sliders 14 can be immovably positioned on the slide rails 20. As shown in FIG. 5, the slide locking mechanism 50 includes a locking member 51 that is received in one of the sliders 14, engagement teeth 52 that are formed in the slider 14, and engagement teeth 53 that are formed in the corresponding slide rail 20. The locking member 51 is formed with engagement slots 51a that can engage the engagement teeth 52 and 53. The locking member 51 is pivotally connected to the slider 14 via pivot pin 54 such that the engagement slots 51a can be engaged with and disengaged from the engagement teeth 52 and 53 by operating a lever 55 that is attached to the locking member 51. Further, the locking member 51 is provided with a torsion spring 56. The torsion spring 56 is arranged and constructed to normally bias the locking member 51 such that the engagement slots 51a can engage the engagement teeth 52 and 53. Therefore, the slide locking mechanism 50 can normally be locked. In other words, the slide locking mechanism 50 can be unlocked only when the lever 55 is operated in order to pivot the locking member 51 around the pivot pin 54 against the spring force of the torsion spring 56.

Because the longitudinal moving mechanism 22 is formed as described above, the longitudinal sliders 14 attached to the seat support members 13 can move forward and rearward along the longitudinal slide rails 20. In addition, the longitudinal sliders 14 can be anchored or immovably positioned at a desired longitudinal position on the slide rails 20 by means of the slide locking mechanism. Therefore, the seat 10 can move forward and rearward along the longitudinal slide rails 20. Also, the seat 10 can be immovably positioned at a desired longitudinal position on the slide rails 20. In addition, the sliders 14 can be disengaged from the slide rails 20 via the openings 21 when the seat 10 is shifted to a rearmost position. Therefore, the seat 10, of which the seat back 12 is in the folded position, can be rotated rearwardly from a position shown by broken lines in FIG. 2 to a position shown by solid lines in FIG. 2 about an axis of rotation, and vice versa.

Figure 4:
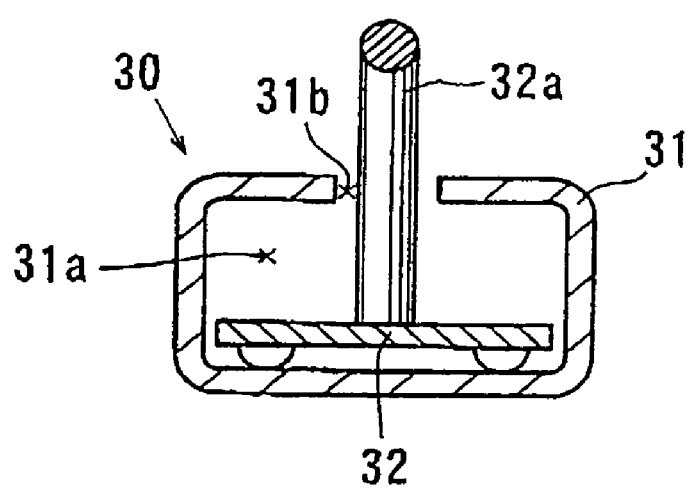
FIG. 4 is a cross-sectional view taken along line IV—IV in FIG. 1.

The lateral moving mechanism 30 includes a linear lateral slide rail 31 (i.e., a lateral moving path) having a rotated C-shape in cross-section, and a lateral slider 32 (i.e., a lateral moving element) that is laterally slidably received within a lateral slide groove 31a formed in the slide rail 31. As best shown in FIG. 4, the upper peripheries of the slide rail 31 are oppositely bent inwardly so as to form an upper lateral slide slot 31b therebetween. In other words, the upper portion of the slide groove 31a is substantially closed except for the slide slot 31b. Similar to the longitudinal slide rails 20, the slide rail 31 is embedded in the vehicle floor F so as to be coplanar with the surface of the vehicle floor F. The slide rail 31 is positioned adjacent to the rear ends of the slide rails 20 so as to laterally extend therealong. Further, as best shown in FIGS. 1 and 4, the lateral slider 32 includes a pair of U-shaped strikers 32a that are fixedly connected thereto. The strikers 32a are arranged and constructed to project upwardly from the slide rail 31 through the slide slot 31b formed in the slide rail 31. The strikers 32a are spaced apart from each other at desired intervals along a sliding direction. That is, the strikers 32a are positioned so as to be aligned with the engagement hooks 16 attached to the seat support members 13 when the lateral slider 32 is shifted to a leftmost position (FIGS. 1 and 2). Further, the strikers 32a are respectively arranged and constructed to releasably engage the engagement hooks 16 so as to form a pair of junctures therebetween when the seat 10 is shifted to the rearmost position after the lateral slider 32 is shifted to the leftmost position (FIG. 2). As will be easily understood, the junctures formed between the strikers 32a and the engagement hooks 16 may function as fulcrums of rotation when the seat 10, of which the seat back 12 is in the folded position, is rotated between the position shown by broken lines in FIG. 2 to the position shown by solid lines in FIG. 2.

As will be recognized, the slide rail 31 of the lateral moving mechanism 30 has a lateral length that can cover the rear ends of a pair of linear longitudinal slide rails (not shown) of the right-side longitudinal moving mechanism. Further, the strikers 32a can be design-changed to releasably engage the engagement hooks 16 only when the seat 10 is rotated from the position shown by broken lines in FIG. 2 to the position shown by solid lines in FIG. 2. As will be appreciated, in such a case, contact points between the seat support members 13 and the vehicle floor F may function as the fulcrums of rotation of the seat 10.

Next, operations of the vehicle seat moving device thus constructed will now be described in detail. Further, described herein is a process for transferring the left-side rear seat 10 positioned on the longitudinal slide rails 20 of the left-side longitudinal moving mechanism 22 onto the longitudinal slide rails of the right-side longitudinal moving mechanism.

First, the longitudinal sliders 14 are slid rearwardly or moved along the slide rails 20 so as to be shifted to the rear ends of the slide rails 20, thereby shifting the seat 10 to the rearmost position thereof. At this time, the engagement hooks 16, attached to the seat support members 13, engage the strikers 32a of the lateral slider 32 of the lateral moving mechanism 30, thereby forming the junctures therebetween. Thereafter, the seat back 12 of the seat 10 is rotated forwardly toward the folded position so that the seat 10 has a folded and lying posture (a posture shown by broken lines in FIG. 2). Subsequently, the seat 10 having the folded and lying posture is rotated rearwardly about the junctures of the strikers 32a and the engagement hooks 16 so as to have a folded and standing posture (a posture shown by solid lines in FIG. 2). Upon rotation of the seat 10, the sliders 14 are disengaged from the slide rails 20 via the openings 21 so that the seat 10 can be shifted to the position shown by solid lines in FIG. 2. The seat 10 thus rotated may preferably be supported on the lateral slider 32 in the folded and standing posture. Thus, the seat 10 is transferred from the left-side longitudinal moving mechanism 22 onto the lateral moving mechanism 30. Preferably, the seat 10 supported on the lateral slider 32 is fixed by means of an appropriate fixture member (not shown) so as to be fixedly retained in this condition.

Thereafter, the lateral slider 32 is moved rightwardly along the lateral slide rail 31 so as to be shifted to a rightmost position (not shown). Thus, the seat 10 supported on the lateral slider 32 is shifted behind the longitudinal slide rails of the right-side longitudinal moving mechanism. Subsequently, the seat 10 is rotated forwardly about the junctures of the strikers 32a and the engagement hooks 16, after the fixture member is released. Upon rotation of the seat 10, the sliders 14 are engaged with the slide rails of the right-side longitudinal moving mechanism via openings (not shown) formed in the slide rails. Thereafter, the engagement hooks 16, attached to the seat support members 13, are disengaged from the strikers 32a of the lateral slider 32. As a result, the seat 10 can move longitudinally along the slide rails of the right-side longitudinal moving mechanism. Thus, the left-side rear seat 10 can be transferred onto the longitudinal slide rails of the right-side longitudinal moving mechanism.

As will be appreciated, the right-side rear seat positioned on the longitudinal slide rails of the right-side longitudinal moving mechanism can be transferred onto the longitudinal slide rails 20 of the left-side longitudinal moving mechanism 22 in the same manner as the process described above.

According to the present vehicle seat moving device, the left-side rear seat 10 can be easily transferred from the left-side row to the right-side row. Similarly, the right-side rear seat can be easily transferred from the right-side row to the left-side row. Therefore, it is possible to increase the degree of freedom of the seat arrangement.

In addition, in the present vehicle seat moving device, the seat 10 is moved laterally along the slide rail 31 while the seat 10 is supported on the strikers 32a (the lateral slider 32) in a folded and standing posture. Therefore, the load of tie seat 10 is substantially vertically imposed on the strikers 32a. In other words, the back and forth bending load imposed on the strikers 32a is effectively eliminated. Therefore, it is not necessary to increase the strength of the strikers 32a, to increase the number of the strikers 32a (e.g., to double the strikers 32a in the longitudinal direction), or to increase the number of lateral moving mechanisms 30. Therefore, the structure of the present vehicle seat moving device can be more simplified than in the conventional devices.

Further, the lateral slider 32 of the lateral moving mechanism 30 is constructed as a built-in type slider that has been previously incorporated in the lateral slide rail 31. Therefore, the seat 10 can smoothly move laterally along the lateral slide rail 31.

Further, the slide rail 31 of the lateral moving mechanism 30 is disposed along the rear ends of the slide rails 20. Therefore, the seat 10 can be moved laterally only after the seat 10 is shifted to the rearmost position. That is, a passenger can identify the position of the lateral moving mechanism 30 by simply shifting the seat 10 to the rearmost position. As a result, the passenger can reliably and speedily move the seat 10 in the lateral direction.

Further, when the seat 10 is moved laterally, the sliders 14 are disengaged from the slide rails 20 (i.e., the slide rails of the left-side longitudinal moving mechanism) so as to move together with the seat 10. Therefore, the seat 10 can be directly coupled to the slide rails of the right-side longitudinal moving mechanism via the sliders 14.

Further, the slide rails 20 and the slide rail 31 are embedded in the vehicle floor F so as to be coplanar with the surface of the vehicle floor F. Therefore, the slide rails 20 and the slide rail 31 can be effectively prevented from interfering with the passengers. This may increase the usability of a vehicle cabin.

Further, the seat 10 cannot be used unless the sliders 14 engage the slide rails of the left-side or right-side longitudinal moving mechanism. This may avoid the use of the seat 10 at an inadequate position.

Second Detailed Representative Embodiment

Figure 6:
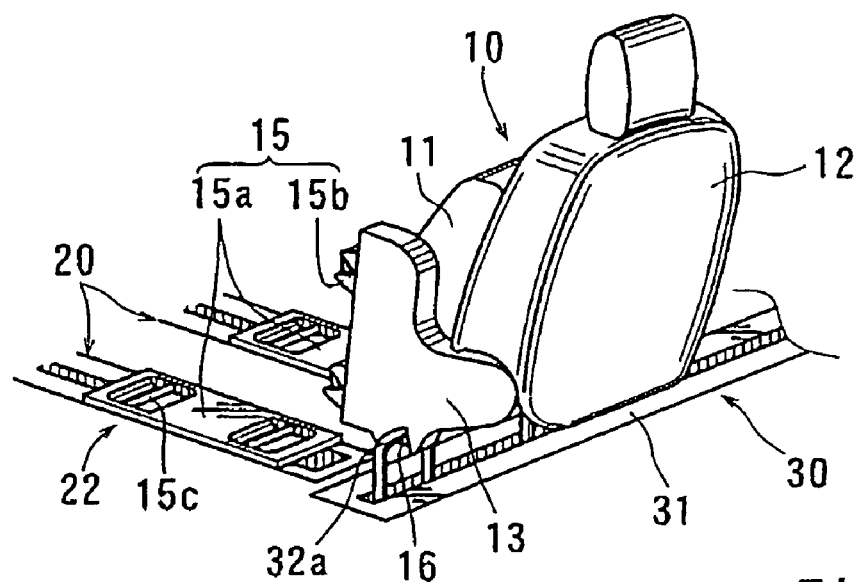
FIG. 6 is a perspective view similar to FIG. 2, which illustrates a vehicle seat moving device according to a second representative embodiment of the present invention that has a pair of longitudinal moving mechanisms (one of which is shown) and a lateral moving mechanism.

The second detailed representative embodiment will now be described with reference to FIG. 6. Because the second embodiment relates to the first embodiment, only constructions, elements and operations that are different from the first embodiment will be explained in detail. Elements that are the same in the first and second embodiments will be identified by the same reference numerals and a detailed description of such elements will be omitted.

In this embodiment, a pair of longitudinal slider assemblies 15 are provided in place of the sliders 14 of the first embodiment. The slider assemblies 15 include sliders or slide bases 15a that are slidably coupled to the slide rails 20, and connector members 15b that are integrally attached to the lower surfaces of the seat support members 13 of the seat 10. The slide bases 15a are preferably shaped so as to not substantially project upwardly from the slide rails 20. The connector members 15b are arranged and constructed to respectively removably engage the slide bases 15a when the seat 10 is positioned on the slide rails 20. The connector members 15b are preferably formed, for example, but are not limited to, as engagement hooks that can engage strikers 15c provided on the slide bases 15a.

In order to transfer the left-side rear seat 10, positioned on the longitudinal slide rails 20 of the left-side longitudinal moving mechanism 22, onto the longitudinal slide rails of the right-side longitudinal moving mechanism, similar to the first embodiment, the seat 10 is shifted to the rearmost position. Thereafter, the seat back 12 of the seat 10 is rotated forwardly toward a folded position so that the seat 10 has a folded and lying posture (not shown). After the connector members 15b are unlocked, the seat 10, having a folded and lying posture, is rotated rearwardly. Upon rotation of the seat 10, the connector members 15b are disengaged from the slide bases 15a. Thereafter, the seat 10 is moved along the slide rail 31 so as to be shifted behind the longitudinal slide rails of the right-side longitudinal moving mechanism. Subsequently, the seat 10 is rotated forwardly so that the connector members 15b can be engaged with slide bases (not shown) that are slidably coupled to slide rails (not shown) of the right-side longitudinal moving mechanism. Thus, the left-side rear seat 10 can be transferred onto the slide rails of the right-side longitudinal moving mechanism.

In this embodiment, the slide bases 15a are constructed as built-in type slide members that have been previously incorporated in the slide rails 20. Therefore, the seat 10 can be engaged with and disengaged from the slide rails 20 by simply engaging the connector members 15b with the slide bases 15a.

Third Detailed Representative Embodiment

Figure 7:
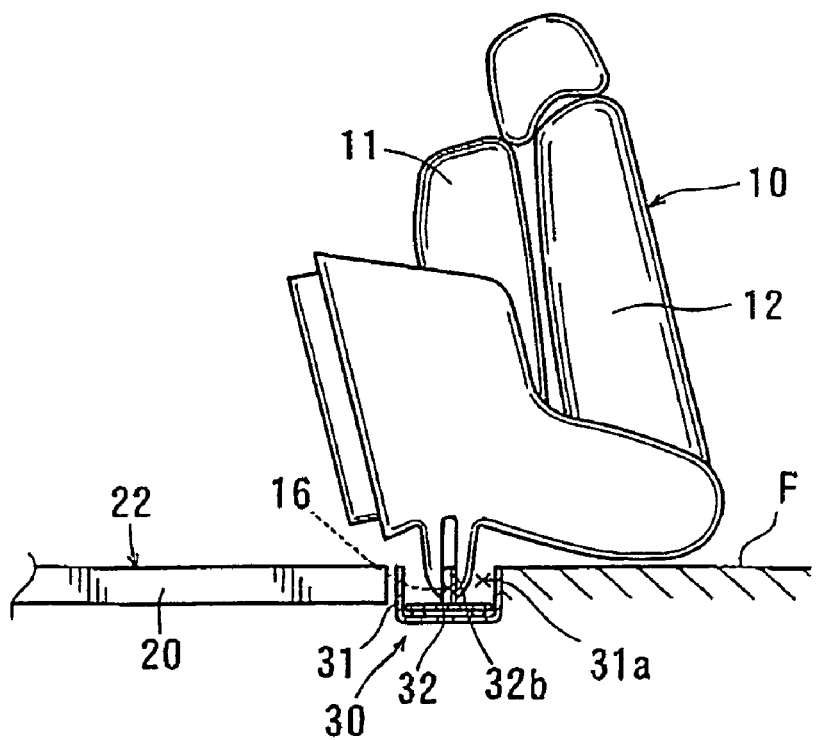
FIG. 7 is a schematic view of a vehicle seat moving device according to a third representative embodiment of the present invention that has a pair of longitudinal moving mechanisms (one of which is shown) and a lateral moving mechanism.

The third detailed representative embodiment will now be described with reference to FIG. 7. Because the third embodiment relates to the first embodiment, only constructions, elements and operations that are different from the first embodiment will be explained in detail. Elements that are the same in the first and third embodiments will be identified by the same reference numerals and a detailed description of such elements will be omitted.

In this embodiment, the lateral slider 32 includes a pair of U-shaped strikers 32b in place of the strikers 32a of the first embodiment. Unlike the strikers 32a of the first embodiment, the strikers 32b are arranged and constructed not to project upwardly from the slide rail 31. In addition, unlike the first embodiment, the upper peripheries of the slide rail 31 are not inwardly bent. In other words, the upper portion of the slide groove 31a is substantially fully opened.

According to this embodiment, unlike the first embodiment, the engagement hooks 16 cannot engage the strikers 32b when the seat 10 is shifted to the rearmost position while the lateral slider 32 is shifted to the leftmost position. That is, as shown in FIG. 7, the engagement hooks 16 can enter the slide groove 31a and engage the strikers 32b only when the seat 10, having a folded and lying posture, is rotated rearwardly so as to have a folded and standing posture. As will be appreciated, in this embodiment contact points between the seat support members 13 and the vehicle floor F may function as the fulcrums of rotation of the seat 10.

According to this embodiment, the strikers 32b do not project upwardly from the vehicle floor F. Therefore, the strikers 32b do not interfere with the passengers. This may increase the usability of a vehicle cabin.

Fourth Detailed Representative Embodiment

Figure 8:
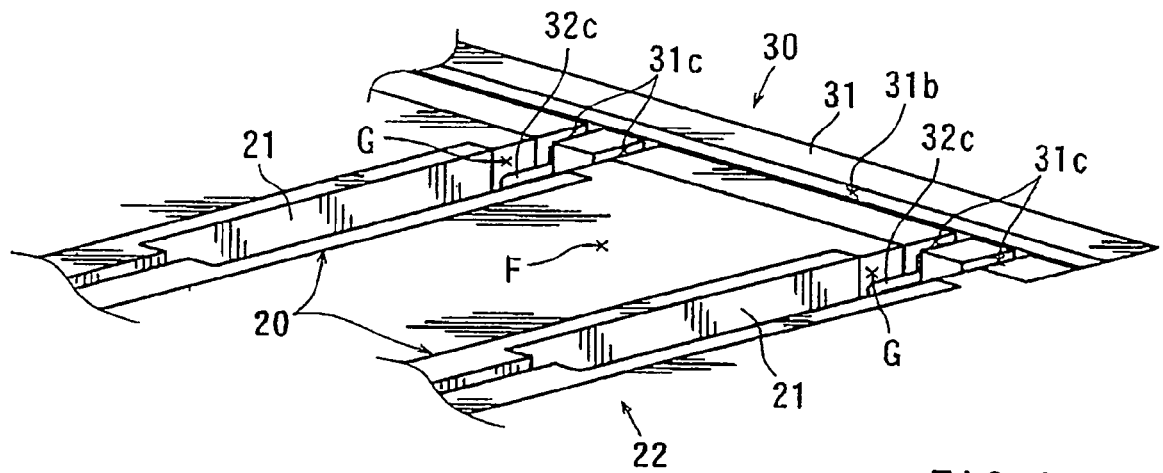
FIG. 8 is a perspective view of a vehicle seat moving device according to a fourth representative embodiment of the present invention that has a pair of longitudinal moving mechanisms (one of which is shown) and a lateral moving mechanism.
Figure 9:
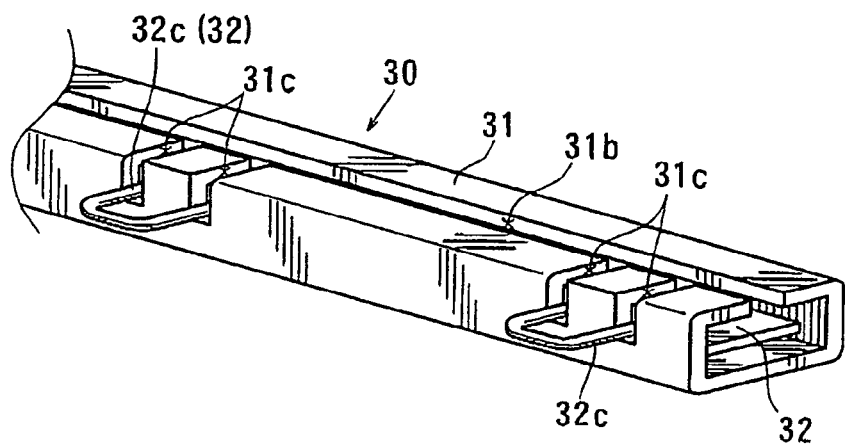
FIG. 9 is a perspective view of the lateral moving mechanism of FIG. 8.
Figure 10:
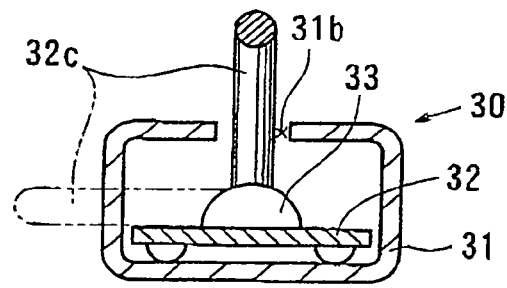
FIG. 10 is a cross-sectional view of FIG. 9 similar to FIG. 4.

The fourth detailed representative embodiment will now be described with reference to FIGS. 8–10. Because the fourth embodiment relates to the first embodiment, only constructions, elements and operations that are different from the first embodiment will be explained in detail. Elements that are the same in the first and fourth embodiments will be identified by the same reference numerals and a detailed description of such elements will be omitted.

In this embodiment, the lateral slider 32 includes a pair of U-shaped strikers 32c in place of the strikers 32a of the first embodiment. As best shown in FIG. 10, unlike the strikers 32a of the first embodiment, the strikers 32c are attached to the lateral slider 32 via a hinge member 33 so as to be moved or rotated back and forth. In addition, as best show in FIG. 9, the lateral slide rail 31 is formed with transverse slots 31c that are arranged and constructed to receive the strikers 32c when the strikers 32c are folded or rotated forwardly. Also, as shown in FIG. 8, the vehicle floor F is formed with striker receiving grooves G that are arranged and constructed to receive the folded strikers 32c. Typically, as shown in FIG. 8, the transverse slots 31c and the grooves G are respectively aligned with the enlarged openings 21 formed in the slide rails 20. Thus, the strikers 32c can be moved or rotated back and forth between a position shown by broken lines in FIG. 10 (i.e., a retracted position) and a position shown by solid lines in FIG. 10 (i.e., an upright use position).

According to this embodiment, the strikers 32c can be retracted when they are not used. In other words, the strikers 32c can be selectively erected or projected upwardly from the slide rail 31 only when the strikers 32c are used in order to laterally move or transfer the left-side seat 10 or the right-side seat between the left-side longitudinal moving mechanism 22 and the right-side longitudinal moving mechanism.

This embodiment may be modified, if necessary. For example, the engagement hooks 16 can be attached to the rear ends of the seat support members 13 at the same level as the folded or retracted strikers 32c so as to engage the strikers 32c when the seat 10 is shifted to the rearmost position. According to this modified structure, the engagement hooks 16 can automatically engage the strikers 32c by simply moving the seat 10 to the rearmost position. Therefore, it is not necessary to erect the strikers 32c in order to engage the engagement hooks 16 and the strikers 32c with each other. As will be appreciated, in this modified form the strikers 32c may preferably be arranged and constructed so as to be automatically erected when the seat 10 is rotated rearwardly.

As described above, according to this embodiment, the strikers 32c can normally be retracted into the vehicle floor F. Therefore, the strikers 32c do not normally interfere with the passengers. This may increase the usability of the vehicle cabin.

Fifth Detailed Representative Embodiment

Figure 11:
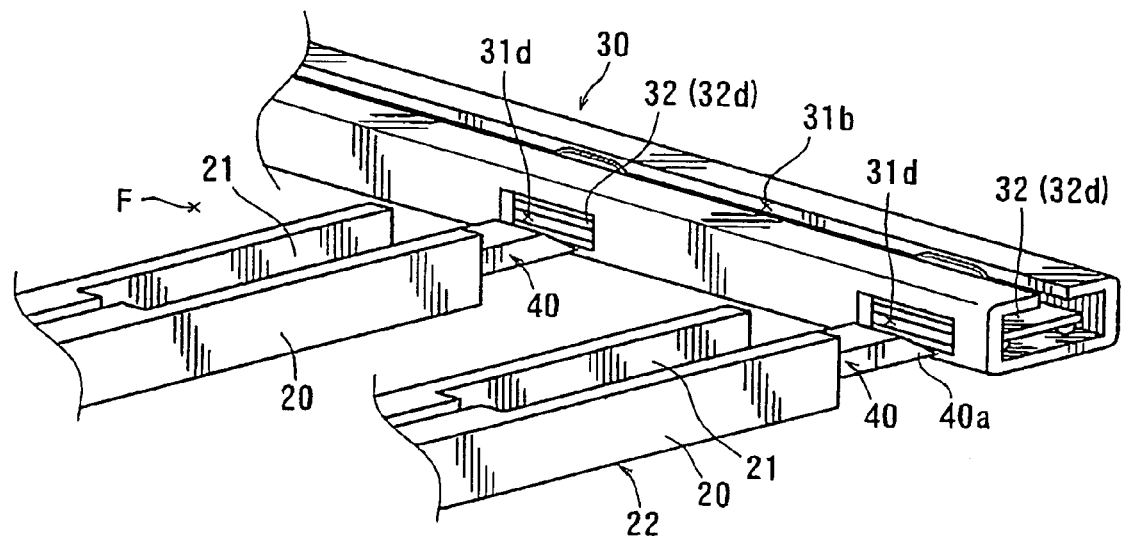
FIG. 11 is a perspective view similar to FIG. 8, which illustrates a vehicle seat moving device according to a fifth representative embodiment of the present invention that has a pair of longitudinal moving mechanisms (one of which is shown) and a lateral moving mechanism.
Figure 12:
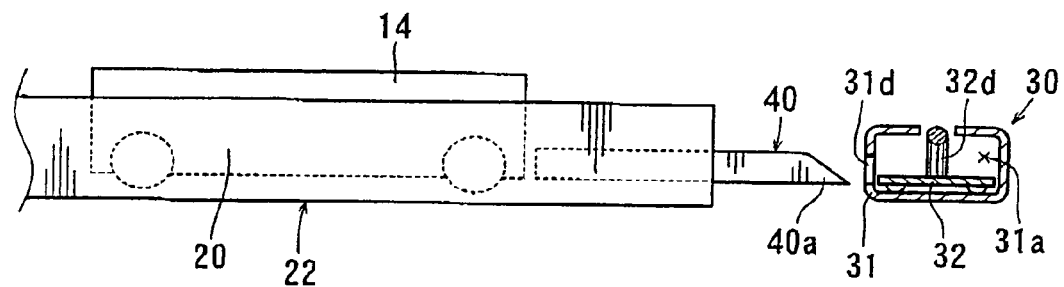
FIG. 12 is a schematic view of the vehicle seat moving device, which illustrates a condition in which a lateral slider of the lateral moving mechanism is not pushed up by slide cam members.
Figure 13:
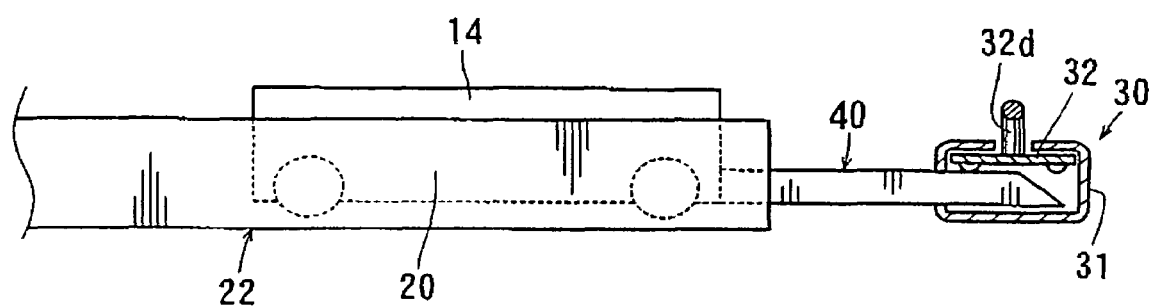
FIG. 13 is a schematic view similar to FIG. 12, which illustrates a condition in which the lateral slider is pushed up by the slide cam members.

The fifth detailed representative embodiment will now be described with reference to FIGS. 11–13. Because the fifth embodiment relates to the first embodiment, only constructions, elements and operations that are different from the first embodiment will be explained in detail. Elements that are the same in the first and fifth embodiments will be identified by the same reference numerals and a detailed description of such elements will be omitted.

In this embodiment, the lateral slider 32 includes a pair of U-shaped strikers 32d in place of the strikers 32a of the first embodiment. Unlike the strikers 32a of the first embodiment, the strikers 32d are arranged and constructed not to project upwardly from the slide rail 31. In addition, as best shown in FIG. 11, the lateral slide rail 31 is formed with side openings or windows 31d that are aligned with the longitudinal slide rails 20. Also, slide cam members 40 are received within the enlarged openings 21 of the slide rails 20. The slide cam members 40 respectively have wedge-shaped rear end portions 40a that face the windows 31d. The slide cam members 40 are arranged and constructed to be pushed into the slide groove 31a of the slide rail 31 via the side openings 31d when the sliders 14 are shifted to the rear ends of the slide rails 20 (i.e., when the seat 10 is shifted to the rearmost position). As shown in FIG. 13, the slide cam members 40, pushed into the slide groove 31a, may push up the slider 32 so that the strikers 32d can be projected upwardly through the slide slot 31b. Further, the slide cam members 40 may preferably be provided with biasing members (not shown) so as to be automatically returned into the enlarged openings 21 of the slide rails 20 after the engagement hooks 16 engage the strikers 32d.

According to this embodiment, the strikers 32d are normally retracted within the slide rail 31. In other words, the strikers 32d are projected upwardly from the slide rail 31 only when the seat 10 is shifted to a rearmost position.

As described above, according to this embodiment, the strikers 32d are normally retracted in the slide rail 31, i.e., in the vehicle floor F. Therefore, the strikers 32d do not normally interfere with the passengers. This may increase the usability of the vehicle cabin.

Naturally, various changes and modifications may be made to the present teachings without departing from the scope of the invention. For example, in the above described embodiments, the slide rail 31 of the lateral moving mechanism 30 is positioned adjacent to the rear ends of the slide rails 20. However, the slide rail 31 can be positioned across the slide rails 20, if necessary.

In these embodiments, the longitudinal slide rails 20 and the lateral slide rail 31 are embedded in the vehicle floor F. However, the slide rails 20 and/or the slide rail 31 can simply be disposed on and fixed to the vehicle floor F.

Further, these embodiments exemplify the seat 10 in which the seat cushion 11 can be rotated rearwardly together with the seat back 12, after the seat back 12 is moved to a folded position. However, it is possible to use a so-called tip-up seat (not shown) in which the seat cushion 11 can be rotated rearwardly toward the seat back 12, if necessary. When such a seat is used, in order to move the seat laterally, the seat cushion 11 may simply be rotated rearwardly after the seat is shifted to a rearmost position.

In these embodiments, the lateral slider 32 has been previously incorporated in the lateral slide rail 31. However, the lateral slider 32 can be attached to the seat 10 so as to engage the slide rail 31 when the seat 10 is rotated rearwardly, if necessary.

Further, these embodiments exemplify the vehicle seat moving device that includes the two longitudinal moving mechanisms and the lateral moving mechanism. However, the vehicle seat moving device may only include the lateral moving mechanism so that the seat can simply be moved laterally, if necessary. Conversely, the vehicle seat moving device may include three or more longitudinal moving mechanisms and two or more lateral moving mechanism, if necessary.

The invention claimed is:

1. A vehicle seat moving device, comprising:
   first and second longitudinal moving mechanisms, each of the longitudinal moving mechanisms having a longitudinal slide rail that is attached to a vehicle floor and a longitudinal slider that is associated with a vehicle seat, and
   a lateral moving mechanism having a lateral moving path that is attached to a vehicle floor and a lateral moving element that is movably attached to the lateral moving path, the lateral moving path being disposed between the first and second longitudinal moving mechanisms so that the lateral moving element can move between the first and second longitudinal moving mechanisms,
   wherein the longitudinal slider is arranged and constructed to slidably engage the longitudinal slide rail,
   wherein the longitudinal slider is arranged and constructed to be engaged with and disengaged from the longitudinal slide rail or the vehicle seat, and
   wherein the lateral moving element can support the vehicle seat thereon when the longitudinal slider is removed from the longitudinal slide rail or the vehicle seat, thereby permitting lateral movement of the vehicle seat.

2. The vehicle seat moving device as defined in claim 1, wherein the longitudinal slider is removed from the longitudinal slide rail when the vehicle seat is moved to a folded and standing posture so that the lateral moving element can support the vehicle seat thereon in the folded and standing posture.

3. The vehicle seat moving device as defined in claim 1, wherein the longitudinal slider is removed from the vehicle seat when the vehicle seat is moved to a folded and standing posture so that the lateral moving element can support the vehicle seat thereon in the folded and standing posture.

4. The vehicle seat moving device as defined in claim 1, wherein the lateral moving element comprises a lateral slider that is laterally slidably incorporated in the lateral moving path, and wherein the lateral slider is arranged and constructed to be removably connected to the vehicle seat.

5. The vehicle seat moving device as defined in claim 1, wherein the lateral moving path is positioned adjacent to the rear end of the longitudinal slide rail so that the vehicle seat can move laterally therealong.

6. The vehicle seat moving device as defined in claim 1, wherein the longitudinal slider comprises a slide base that is slidably coupled to the slide rail, and wherein the vehicle seat is provided with a connector member that can removably engage the slide base.

7. The vehicle seat moving device as defined in claim 4, wherein the lateral slider comprises a striker that can engage an engagement hook attached to the vehicle seat, and wherein the striker is arranged and constructed to engage the engagement hook when the vehicle seat is longitudinally shifted to a desired position.

8. The vehicle seat moving device as defined in claim 7, wherein the striker is attached to the lateral slider via a hinge member so as to be moved or rotated back and forth between an upright use position and a retracted position.

9. The vehicle seat moving device as defined in claim 7, wherein the longitudinal slide rail is provided with a slide cam member that is arranged and constructed to move the striker upwardly when the vehicle seat is shifted to the rearmost position.

10. The vehicle seat moving device as defined in claim 1, wherein the longitudinal slide rail and the lateral moving path are arranged and constructed to not project upwardly from the vehicle floor.

11. The vehicle seat moving device as defined in claim 4, wherein the lateral slider comprises a striker that can engage an engagement hook attached to the vehicle seat, and wherein the striker is arranged and constructed to engage the engagement hook when the vehicle seat is moved to a folded and standing posture after the vehicle seat is shifted to a rearmost position.

12. A vehicle seat moving device, comprising:
first and second longitudinal moving mechanisms, each of the longitudinal moving mechanisms having a longitudinal slide rail that is attached to a vehicle floor and a longitudinal slider that is attached to a vehicle seat, the longitudinal slider being arranged and constructed to be slidably and removably connected to the longitudinal slide rail, and a lateral moving mechanism having a lateral moving path that is attached to a vehicle floor and a lateral moving element that is movably attached to the lateral moving path, the lateral moving path being positioned between the first and second longitudinal moving mechanisms so as to be adjacent to the rear ends of the respective longitudinal slide rails, the lateral moving element being arranged and constructed to engage the vehicle seat when the vehicle seat is longitudinally shifted to a rearmost position, wherein the longitudinal slider is arranged and constructed to be removed from the longitudinal slide rail when a seat cushion is tipped up toward a seat back after the vehicle seat is shifted to the rearmost position so that the lateral moving element can support the vehicle seat thereon.

13. The vehicle seat moving device as defined in claim 12, wherein each of the longitudinal moving mechanisms includes a slide locking mechanism that can lock the longitudinal slider at a desired position on the longitudinal slide rail.

14. A vehicle seat moving device, comprising:
first and second longitudinal moving mechanisms, each of the longitudinal moving mechanisms having a longitudinal slide rail that is attached to a vehicle floor and a longitudinal slider that can be engaged with and disengaged from a vehicle seat via a connector member, the longitudinal slider being slidably connected to the longitudinal slide rail, and a lateral moving mechanism having a lateral moving path that is attached to a vehicle floor and a lateral moving element that is movably attached to the lateral moving path, the lateral moving path being positioned between the first and second longitudinal moving mechanisms so as to be adjacent to the rear ends of the respective longitudinal slide rails, the lateral moving element being arranged and constructed to engage the vehicle seat when the vehicle seat is longitudinally shifted to a rearmost position, wherein the longitudinal slider is arranged and constructed to be removed from the vehicle seat via the connector member when a seat cushion is tipped up toward a seat back after the vehicle seat is shifted to the rearmost position so that the lateral moving element can support the vehicle seat thereon.

15. The vehicle seat moving device as defined in claim 14, wherein each of the longitudinal moving mechanisms includes a slide locking mechanism that can lock the longitudinal slider at a desired position on the longitudinal slide rail.

* * * * *